United States Patent [19]

Wagner et al.

[11] 4,002,198

[45] Jan. 11, 1977

[54] FINNED TUBE HEAT EXCHANGER USED AS A DESUBLIMATOR FOR ISOLATING SUBLIMATION PRODUCTS, ESPECIALLY PHTHALIC ANHYDRIDE, FROM REACTION GASES

[75] Inventors: Joachim Wagner, Ludwigshafen; Harry Kassat, Bochum, both of Germany

[73] Assignee: BASF Aktiengesellschaft, Ludwigshafen (Rhine), Germany

[22] Filed: Aug. 28, 1975

[21] Appl. No.: 608,626

[30] Foreign Application Priority Data

Sept. 5, 1974 Germany .......................... 2442420

[52] U.S. Cl. .............................. 165/61; 23/294 R; 55/269; 165/111; 165/172; 165/176

[51] Int. Cl.² .......................................... B01D 7/00

[58] Field of Search .......... 165/172, 176, 150, 111, 165/61; 23/294 R, 294 S, 273 R; 55/269

[56] References Cited

UNITED STATES PATENTS

| | | | |
|---|---|---|---|
| 1,936,284 | 11/1933 | Bergman | 165/172 X |
| 3,609,943 | 10/1971 | Richter | 55/269 X |
| 3,819,333 | 6/1974 | Brand et al. | 165/176 X |

FOREIGN PATENTS OR APPLICATIONS

| | | | |
|---|---|---|---|
| 1,199,820 | 12/1959 | France | 23/294 |
| 69,668 | 11/1927 | Sweden | 165/181 |
| 435,895 | 10/1935 | United Kingdom | 165/181 |

*Primary Examiner*—Albert W. Davis, Jr.
*Attorney, Agent, or Firm*—Johnston Keil Thompson & Shurtleff

[57] ABSTRACT

A finned tube heat exchanger for isolating sublimates, especially phthalic anhydride, in which the finned tubes arranged in parallel alongside one another and above one another and connected by headers and tube bends permit flow through them successively in the first, then the third, then the second and then the fourth row, and that the transverse fins are arranged in rows staggered laterally in opposite directions by an amount corresponding to from half the spacing to the whole spacing between adjacent fin edges.

9 Claims, 7 Drawing Figures

FINNED TUBE HEAT EXCHANGER USED AS A DESUBLIMATOR FOR ISOLATING SUBLIMATION PRODUCTS, ESPECIALLY PHTHALIC ANHYDRIDE, FROM REACTION GASES

The invention relates to a desublimator for isolating sublimation products, especially phthalic anhydride, from reaction gases, which consists of a housing with connections to permit the passage of the reaction gas and the discharge of the molten sublimation product, and of several rows, fitted one above the other, approximately horizontally, within the housing, of identical finned tube bundles, supported so that they can move independently of one another when undergoing heat expansion or contraction, the bundles being intended alternately to be subjected, from the inside, to a heating medium and a coolant. The reaction gas travels, within the housing, transversely to the direction of flow of the heating medium and coolant in the tubes, and the finned tube bundles, arranged parallel, above one another and optionally also alongside one another, consist of at least two rows of tubes, arranged above one another, which are connected to one another, at one end, by tube bends, to form a hairpin tube. At the opposite end, the rows of tubes are connected to a collecting and distributor chamber for the heating medium or coolant, and the transverse fins mounted on the core tubes are staggered laterally in rows, in opposite directions, within each tube bundle.

A variety of embodiments of desublimators of such construction have been disclosed (British Pat. No. 751,352, French Pat. No. 1,136,737 and German Printed Application No. 1,072,965). Mounting the individual finned tube bundles within the housing so that they can move independently of one another when undergoing heat expansion have also been disclosed in our U.S. Pat. No. 3,905,430.

In these desublimators, heat exchange takes place at the finned outer surfaces of the finned tube bundles. During the cooling process the coolant, preferably cold oil, is pumped through the tubes whilst the reaction gases flow externally around the transverse fins of the tubes. Depending on the degree of saturation of phthalic anhydride in the reaction gas, the product precipitates as a solid and settles on the finned outer surfaces. After it has separated out, the heating medium, preferably hot oil, is passed through the finned tube bundles so that the product melts off the finned outer surfaces and is collected, at the bottom end of the housing, in a suitably heated collecting trough from where it is discharged.

In order to achieve the maximum efficiency during the cooling process for separating the solid product, it is essential that the finned surfaces should be so distributed within the housing that the reaction gas, on flowing through the housing, does not find any linear flow paths, i.e. channels, in which heat exchange can only occur to an unsatisfactory degree, if at all.

A method which has been disclosed (German Pat. No. 1,082,230) to avoid the formation of such channels in similar desublimators is to stagger the rows of tubes, located one above the other, of the individual finned tube bundles laterally, i.e. transversely to the axis of the tubes, alternately to opposite sides, in each case by half the tube diameter. This staggered arrangement of the finned tubes can be used without disadvantage as long as the amount of cold oil pumped through the hairpin tubes of the finned tube bundles in two or four passes is sufficiently great. However, for cost reasons it is frequently necessary to reduce the amount of cold oil.

If in that case the size of the finned tube bundles which has been found to be the optimum is retained, the oil velocity inside the finned tube bundles also decreases the heat transfer co-efficient on the oil side and the amount of heat transferable are correspondingly reduced. In order to avoid an excessive reduction in the amount of heat transferable and to be able to retain sizable finned tube bundles it is necessary correspondingly to increase the number of passes on the oil side of the finned tube bundles. This is done by welding transverse or vertical webs, in addition to the longitudinal or horizontal webs, into the collecting and distributor chamber at the end of the individual finned tube bundles. In this way, the number of passes can be increased from the normal four to, e.g., twelve or more, and accordingly, even if the amount of cold oil pumped through the individual finned tube bundles is reduced, a sufficiently high oil velocity to give an optimum heat transfer coefficient and heating capacity is ensured.

It is an object of the present invention to avoid the above disadvantages and, whilst retaining finned tube bundles of optimum dimensions and design, each with four superposed rows of tubes and a multi-pass circuit, so to construct the bundles that linear flow paths (channels) are avoided.

According to the invention, this object is achieved by an arrangement wherein each finned tube bundle consists of four superposed rows of tubes, with the said superposed tubes being aligned with one another relative to the direction of flow of the reaction gases, the tubes of the rows of tubes being connected to one another, by the common header, in such a way that the same stream of heating medium or coolant successively flow through the tubes or groups of tubes of the first and third row of tubes and of the second and fourth row of tubes and that the transverse fins fixed on the core tubes are mounted on the latter eccentrically to the axes of the tubes and staggered in rows, laterally in opposite directions, by an amount corresponding to about from half the spacing to the whole spacing between the laterally adjacent edges of fins.

The eccentric staggering of the cross-fins, directed to opposite sides in alternate rows, relative to the core tubes, by at least half the spacing between the fin edges, can be realized both in the case of elliptical core tubes with rectangular fins and in the case of circular core tubes with square fins or circular core tubes with round fins. The only requirement is that the fins should be punched out of sheet metal strip and then slipped onto the core tubes, to which they can be fixed by welding or by distention of the core tubes.

Experiments have shown that with an eccentric arrangement of the transverse fins on the core tubes it is possible to provide turbulence surfaces, punched out of the major surface zone of the fins and angled at about 90° to the surface of the fins, and that these turbulence surfaces have a particularly favorable influence on the process of deposition. The greater pressure drops caused by these additional turbulence surfaces are highly desirable, above all at the start of the process, because they give a more uniform distribution of the reaction gases over several desublimators connected in parallel, which are brought into the cooling process at different times. If the fins are mounted centrally on the core tubes, the fin surface does not suffice for provision of such turbulence surfaces.

According to a further characteristic of the invention, the turbulence surfaces provided on the major face of the fins are suitably inclined to the horizontal at an acute angle of from about 10° to at most 45°. A particularly advantageous embodiment results if the turbulence surfaces arranged above one another of each fin are staggered laterally and are at the same time alternately inclined to opposite sides relative to the horizontal. It has been found that, all other conditions being equal, the deposition of the product can be improved substantially by these additional turbulence surfaces provided on the eccentrically arranged transverse fins.

The drawing illustrates an example of the invention.

Figure 1:
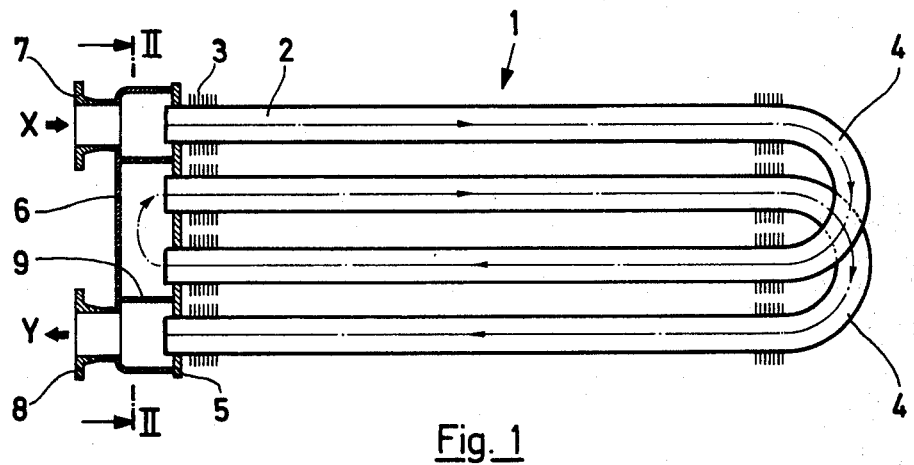
FIG. 1 shows a finned tube bundle as a longitudinal section through the collecting and distributor chamber at the end.
Figure 2:
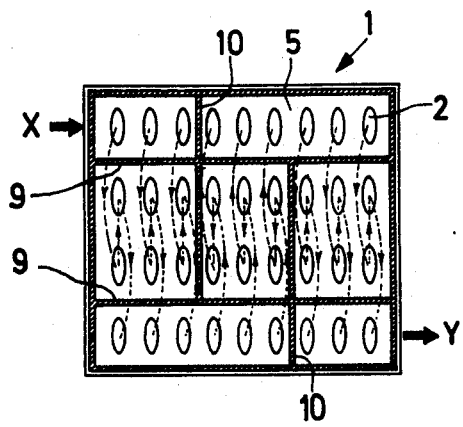
FIG. 2 shows a cross-section through the header along line II — II in FIG. 1.

The finned tube bundle 1 according to FIGS. 1 and 2 consists of elliptical core tubes 2 of which the major axis of cross-section is in the direction of flow of the reaction gases, and onto which tube rectangular transverse fins 3 have been slipped and fixed by conventional methods. The finned tube bundle 1 has a total of four superposed rows of such externally finned core tubes, and in the case of FIG. 2 nine core tubes are arranged alongside one another in each of the four rows. Of course, the number of finned tubes per row can also be made larger or smaller.

As may be seen from FIG. 1, the finned tubes are connected to one another at one end of the finned tube bundle by means of tube bends 4 to form hairpin tubes, the arrangement being such that the first or uppermost row forms hairpin tubes with the tubes of the third row, and the tubes of the second row form hairpin tubes with the tubes of the fourth or bottom row.

FIG. 2 shows that the tubes which are superposed within the individual rows of tubes are aligned with each other relative to the direction of flow of the reaction gas, i.e they are not mutually staggered. To permit this, the tube bends 4 are also slightly curved in the vertical plane, as is indicated by the arrows in FIG. 2.

At the end opposite the tube bends 4 the finned tubes 2, 3 of the bundle 1 are welded by conventional methods into a tube plate 5 to which, in turn, the common header 6 is welded. In this way, all the finned tubes of the tube bundle are connected to one and the same collecting and distributor chamber. This chamber has an inlet nozzle 7 and outlet nozzle 8 for feeding in and discharging a heating medium and coolant alternately, in particular hot oil and cold oil alternately.

As may in particular be seen from FIG. 2, both horizontal longitudinal webs 9 and vertical transverse webs 10 are welded into the header 6, in the form of straight sheets of metal, so that the cold oil or hot oil fed in through the nozzle 7 flows through the individual tubes or groups of tubes of the finned tube bundle in a total of twelve successive passes before it is again discharged at the nozzle 8. The flow path of the oil through the individual groups of tubes is shown by arrows in FIGS. 1 and 2. The arrow X shows the direction of the oil fed in and the arrow Y the direction of the discharged oil.

Figure 3:
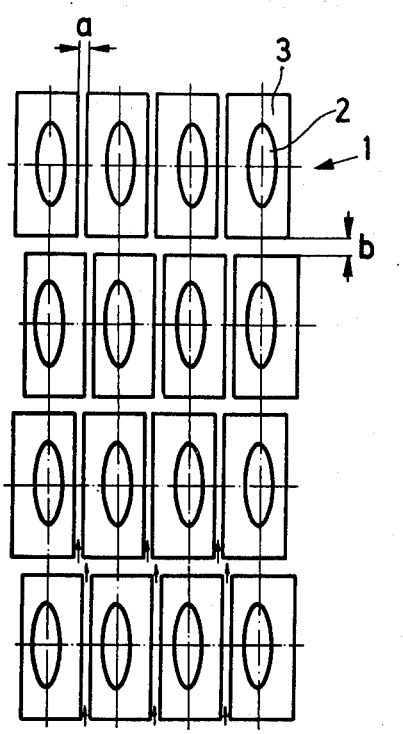
FIG. 3 shows schematically the eccentric staggering and arrangement of the fins within the finned tube bundle when using elliptical core tubes and rectangular transverse fins.

As may be seen in particular from FIG. 3, the rectangular transverse fins 3 of the superposed rows of tubes are each staggered alternately to opposite sides eccentrically relative to the core tubes 2, so that in spite of the aligned superposed arrangement of the core tubes the reaction gases which flow upwards through the finned tube bundle cannot find any continuous channels. Instead, the flow path through the fins which are alternately staggered in opposite directions eccentrically relative to the core tubes is stepped or staggered, from one row of tubes to the next, by an amount corresponding to at least the distance $a$ between the edges of laterally adjacent fins. In the embodiment shown, the distance $a$ between edges of the laterally adjacent fins 3 is preferably 4 mm and the eccentric staggering of the fins relative to the longitudinal axis of the core tubes is about 2 mm. The distance $b$ between the edges of vertically adjacent fins 3 is also 4 mm in this embodiment.

In the axial direction of the core tubes 2, the spacing of successive fins 3 is 8 mm in the embodiment shown.

Figure 4:
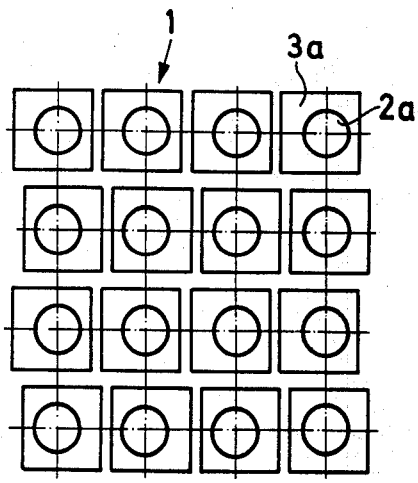
FIG. 4 shows schematically the corresponding arrangement when using circular core tubes and square fins.
Figure 5:
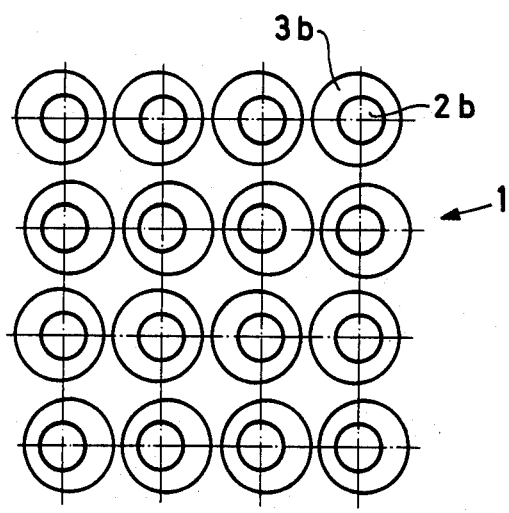
FIG. 5 shows schematically the corresponding arrangement when using round core tubes and round fins.

In the embodiment according to FIG. 4, circular core tubes $2a$ with square fins $3a$ are used, whilst in the embodiment according to FIG. 5 circular core tubes $2b$ with round fins $3b$ are used. In both cases, the fins are again staggered eccentrically relative to the axes of the core tubes by an amount which is between half the distance and the whole distance between adjacent fin edges.

It may be seen readily from FIGS. 3, 4 and 5 that the eccentric staggering of the fins relative to the axes of the core tubes is constant within a finned tube bundle and that it is only the direction of this eccentric staggering, which is the same within each row of tubes, which alternates from one row of tubes to the next.

Figure 6:
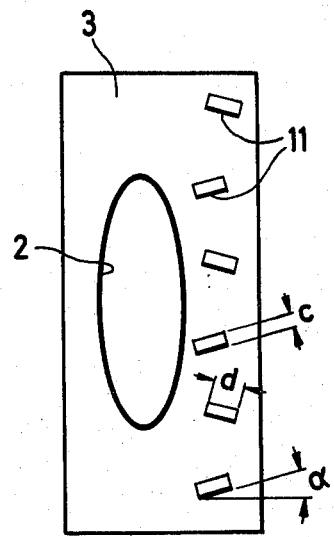
FIG. 6 shows an improved embodiment of the transverse fins with punched-out turbulence surfaces, use being made of elliptical core tubes and rectangular fins.
Figure 7:
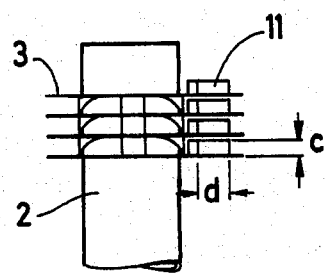
FIG. 7 shows a plan view of the finned tube according to FIG. 6.

In the particularly preferred embodiment shown in FIGS. 6 and 7, the rectangular fins 3 possess turbulence surfaces 11 on the side of the fin which is larger because of the eccentric staggering relative to the longitudinal axis of the elliptical core tubes 2; these turbulence surfaces 11 are punched out, angled at about 90° to the face of the fin and inclinced to the horizontal at an acute angle $\alpha$ of about 15°. As may be seen particularly from FIG. 6, the vertically superposed turbulence surfaces 11 of each fin are laterally staggered and alternately inclined in opposite directions to the horizontal. In the embodiment shown, the turbulence surfaces have a height $c$ of about 3 mm and a length $d$ of about 6 mm. In the direction of the tube axis, successive fins 3 are spaced at 8 mm.

We claim:

1. A finned tube heat exchanger used as a desublimator for isolating sublimation products, especially phthalic anhydride, from reaction gases, which consists of a housing with connections to permit the passage of the reaction gas and the discharge of the molten sublimation product, and of several rows, fitted one above the other, approximately horizontally, within the housing, of identical finned tube bundles, supported so that they can move independently of one another when undergoing thermal expansion or contraction, the bundles being intended alternately to be subjected, from the inside, to a heating medium and a coolant, especially a heat transfer oil, wherein the reaction gas travels, within the housing, transversely to the direction of flow of the heating medium and coolant in the tubes, and finned tube bundles, arranged parallel, above one another and optionally also alongside one another, consist of at least two rows of tubes, arranged above one another, which are connected to one another, at one end, by tube bends, to form a hairpin tube, and at the opposite end, the rows of tubes are connected, by means of a tube plate, to a collecting and distributor chamber for the heating medium or coolant, and the transverse fins mounted on the core tubes are staggered laterally in rows, in opposite directions, within each tube bundle, wherein each finned tube bundle (1) consists of four superposed rows of tubes, with the said superposed tubes (2, 2a, 2b) being aligned with one another relative to the direction of flow of the reaction gases, the tubes of the rows of tubes being connected to one another, by the common header (6), in such a way that the same stream of heating medium or coolant successively flows through the tubes or groups of tubes of the first and third row of tubes and of the second and fourth row of tubes and the transverse fins (3, 3a, 3b) fixed on the core tubes (2, 2a, 2b) being mounted on the latter eccentrically to the axes of the tubes and staggered in rows, laterally in opposite directions, by an amount corresponding to about from half the spacing to the whole spacing between the laterally adjacent edges of fins.

2. Finned tube heat exchanger as claimed in claim 1, wherein the fins possess, on the part of their face which is the larger as a result of their eccentric staggering relative to the axis of the core tube, conventional turbulence surfaces (11) which are punched out, angled at about 90° to the face of the fin and inclined to the horizontal at an acute angle of from about 10° to at most 45°.

3. Finned tube heat exchanger as claimed in claim 2, wherein the vertically superposed turbulence surfaces (11) of each fin are staggered laterally.

4. Finned tube heat exchanger as claimed in claim 2, wherein the vertically superposed turbulence surfaces (11) of each fin are inclined alternately in opposite directions to the horizontal.

5. Finned tube heat exchanger as claimed in claim 2, wherein the turbulence surfaces (11) are from about 2 to 6 mm high and from 3 to 10 mm long and are inclined to the horizontal at not less than about 15°, optionally alternately in opposite directions.

6. Finned tube heat exchanger as claimed in claim 1, wherein the fins (3) are spaced at not less than 6 mm in the axial direction of the core tubes (2) and are mutually staggered relative to the vertically and horizontally adjacent tubes of the same finned tube bundle.

7. Finned tube heat exchanger as claimed in claim 1, wherein the finned tube bundles (1) have conventional elliptical core tubes (2), of which the major axis of cross-section is aligned parallel to the direction of flow of the reaction gases, and the fins (3) mounted on these tubes are reactangular, the distance (a) between edges of laterally adjacent fins being at least about 3 mm.

8. Finned tube heat exchanger as claimed in claim 7, wherein the distance (b) between edges of superposed fins is also at least 3 mm.

9. Finned tube heat exchanger as claimed in claim 1, wherein the eccentric staggering of the fins on the core tubes is at least about 1.5 mm in both directions.

* * * * *